No. 873,544. PATENTED DEC. 10, 1907.
R. W. HARROUN.
AUTOMOBILE BUMPER.
APPLICATION FILED MAR. 29, 1906.
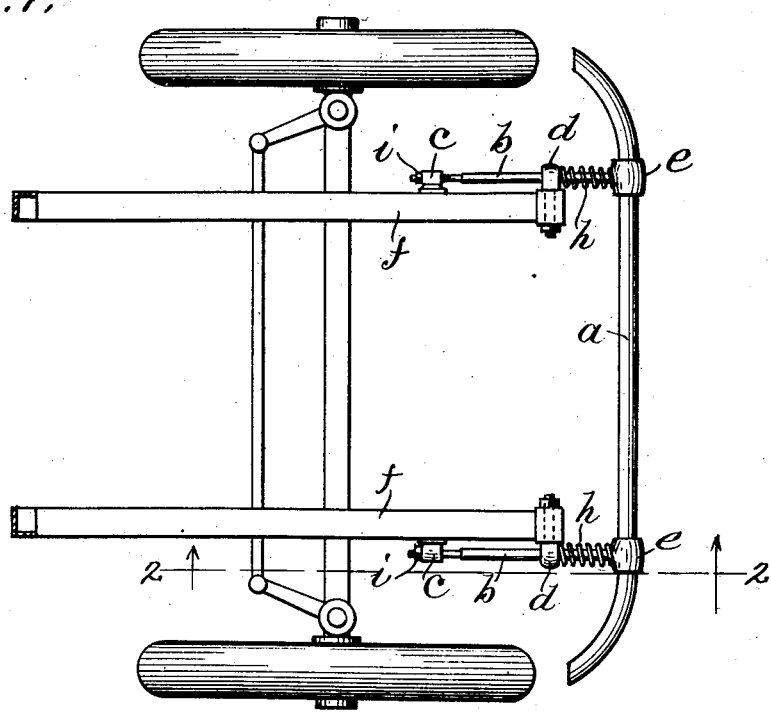
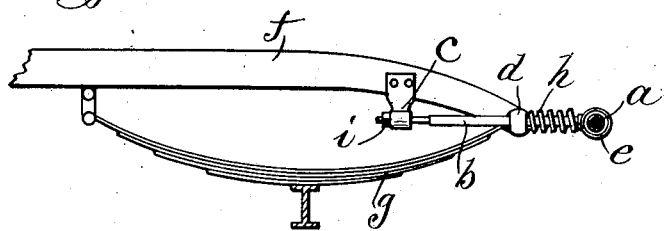
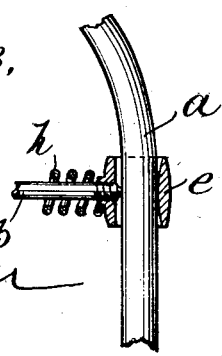
Inventor:
Ray W. Harroun

UNITED STATES PATENT OFFICE.

RAY W. HARROUN, OF CHICAGO, ILLINOIS.

AUTOMOBILE-BUMPER.

No. 873,544.  Specification of Letters Patent.  Patented Dec. 10, 1907.

Application filed March 29, 1906. Serial No. 308,683.

*To all whom it may concern:*

Be it known that I, RAY W. HARROUN, a citizen of the United States, residing at Chicago, in the county of Cook and State of Illinois, have invented an Automobile-Bumper, of which the following is a specification.

My invention relates to automobile bumpers or fenders which are placed on the front end of cars to protect the same in case of collisions, and the objects of my improvements are, first, to protect the automobile or parts thereon from damage by collision; second, to mount the bumper on the car by means of spring connection so as to absorb any shocks caused by a collision; third, to make the device applicable to any style of car; fourth, to make a strong, durable and cheap construction and other objects to become apparent from the description to follow.

An automobile is most likely to be damaged on the front end in a collision by coming in contact with vehicle wheels, posts, etc., and therefore a horizontal bar extending across the front of a car at a proper distance from the ground serves very well as a protector. This guard rail could be rigidly secured to the car, but I prefer to mount it so that it can give and act as a cushion when it is bumped against an object.

To describe my invention so that others versed in the art to which it pertains may understand it sufficiently to make and use the same, I have illustrated it on the accompanying sheet of drawing forming a part of this specification, in which:—

Figure 1, is a plan view of a device embodying my invention attached to an automobile frame; Fig. 2, is a section on 2—2 of Fig. 1, and Fig. 3, is a detail sectional view of a connection used in the device.

Similar reference characters refer to similar parts throughout the several views.

The guard rail $a$ which is preferably made of tubing and has its extremities bent, is secured on the front ends of the two arms or rods $b$, which are slidingly mounted in the brackets $c$ and the heads of bolts $d$. The ends of the arms $b$ are provided with the sleeves or collars $e$ through which the rail $a$ is passed and is then secured against movement therein by screwing the ends of the arms $b$ tightly against said rail $a$.

The bolts $d$ serve to secure one end of each spring $g$ to the car frame $f$. The coiled compression springs $h$ are interposed between the sleeves $e$ and the heads of bolts $d$ so as to normally hold the rail $a$ forward of said bolts. The nuts $i$ secured on the rear ends of the arms $b$ just back of the brackets $c$ prevent the arms $b$ from being pushed out forwardly by the springs $h$, the brackets $c$ being rigidly secured to the frame $f$.

In operation when the car collides with an object the rail $a$ being in advance of anything on the car will receive the shock. When the bump or collision is of sufficient force the springs $h$ will be partly compressed while the arms $b$ slide rearwardly in their bearings.

It will be understood that slight changes in the construction and form of the parts may be made without deviating from the spirit of the invention.

Having thus fully described my invention what I claim as new and desire to secure by Letters Patent of the United States is:—

1. In an automobile bumper, a rail extending across the front of an automobile attached to the frame by horizontal arms running through eye bolts at the frame ends and supported by brackets at the rear ends backed up by springs surrounding said horizontal arms.

2. In an automobile bumper or fender, the combination of a rail, two supporting rods connected at their ends to said rail, guides adapted to be secured to opposite sides of an automobile wherein said rods are slidingly supported between their ends, cushioning means for said rail, and guide brackets adapted to be secured to opposite sides of an automobile in which said rods are slidingly supported near their rear extremities.

3. In an automobile bumper or fender, the combination of a rail; two supporting rods connected to said rail and extending rearward therefrom; guides, adapted to be secured to opposite sides of an automobile, wherein said rods are respectively slidingly supported between their ends; other guides, adapted to be secured to opposite sides of an automobile, wherein said rods are respectively slidingly supported near their rear ends; and coiled springs, surrounding said rods, each with one end arranged for movement with the rod and its other end abutting against a guide.

4. In an automobile bumper or fender, the combination of a rail; two supporting rods connected with said rail and extending rearwardly therefrom, each said rod having its rear end reduced; guides wherethrough the larger part of the rods slide, adapted for connection to the sides of an automobile; other guides wherethrough the reduced ends only of said rods slide, adapted for connection to the sides of an automobile; stops near the extremities of said rods; and springs for yieldingly holding said rods in forwardmost position in the guides.

5. In a bumper for association with an automobile having side frames and springs joining at their extremities, the combination of eye-bolts, having guiding eyes, and stems for connecting the springs and frame members and being positioned thereby; bracket members for connection with the sides of an automobile in rear of said eye bolts; parallel rods extending through and sliding in said eye-bolts and brackets; a cross rail connected to and carried by the forward ends of said rods; and coiled springs surrounding the said rods and at opposite ends bearing against the rods and eye bolts respectively.

6. A vehicle fender comprising, in combination, an impact bar, rods on the outer ends of which said bar is supported and longitudinally adjustable, guiding supports adapted to be secured on opposite sides of a vehicle and in which said rods are guidedly supported between their ends, cushioning means for said bar, and guide brackets adapted to be secured to opposite sides of a vehicle and in which said rods are movably supported near their rear ends.

7. A vehicle fender comprising, in combination, an impact bar, supporting rods having heads on their outer ends in which said bar is supported and longitudinally adjustable, clamping means on said rods for fastening the bar in adjusted position, guiding supports adapted to be secured on opposite sides of a vehicle and in which said rods are guidedly supported between their ends, cushioning means for the bar, and guide brackets adapted to be secured to the sides of a vehicle and in which said rods are movably supported near their rear ends.

8. A vehicle fender comprising, in combination, an impact bar, supporting rods connected with said bar, guiding supports adapted to be secured to the opposite sides of a vehicle and in which said rods are guidedly supported between their ends, a plurality of end abutting coiled spring sections secured between said bar and each guiding support, and guide brackets adapted to be secured on opposite sides of a vehicle and in which said rods are movably supported near their rear ends.

RAY W. HARROUN.

Witnesses:
J. W. McCausland,
H. M. Jones.